United States Patent [19]

Hashimoto et al.

[11] Patent Number: 5,698,336
[45] Date of Patent: Dec. 16, 1997

[54] MAGNETIC RECORDING MEDIUM

[75] Inventors: Minoru Hashimoto; Tatsumi Maeda, both of Yokohama; Masahiro Fukasawa, Kamakura; Kazutaka Akiyama; Tsutomu Tanaka, both of Yokohama, all of Japan

[73] Assignee: Kabushiki Kaisha Toshiba, Kanagawa-ken, Japan

[21] Appl. No.: 629,766

[22] Filed: Apr. 9, 1996

Related U.S. Application Data

[63] Continuation of Ser. No. 57,889, May 7, 1993, abandoned, which is a continuation-in-part of Ser. No. 904,065, Jun. 26, 1992, abandoned.

[30] Foreign Application Priority Data

Jun. 28, 1991  [JP] Japan ........................ 3-158014
Mar. 19, 1992  [JP] Japan ........................ 4-62797

[51] Int. Cl.$^6$ ........................................ G11B 5/66
[52] U.S. Cl. ................ 428/694 B; 428/694 BA; 428/694 BM; 428/900; 252/62.54; 252/62.56; 252/62.59; 252/62.63; 252/62.64
[58] Field of Search .............. 428/694 B, 694 BA, 428/694 BM, 900; 252/62.54, 62.56, 62.59, 62.63, 62.64

[56] References Cited

U.S. PATENT DOCUMENTS

| | | | |
|---|---|---|---|
| 4,636,433 | 1/1987 | Kubo et al. | 428/328 |
| 4,770,933 | 9/1988 | Kitahata et al. | 428/323 |
| 4,778,734 | 10/1988 | Ohdon et al. | 428/694 BA |
| 4,828,916 | 5/1989 | Yamamoto et al. | 428/329 |
| 4,851,292 | 7/1989 | Nagai et al. | 428/403 |
| 4,957,812 | 9/1990 | Aoki et al. | 428/329 |
| 5,047,290 | 9/1991 | Kishismoto et al. | 428/323 |

FOREIGN PATENT DOCUMENTS

| | | |
|---|---|---|
| 0 220 586 | 5/1987 | European Pat. Off. |
| 56-60001 | 5/1981 | Japan |
| 63-139017 | 6/1988 | Japan |
| 63-144118 | 6/1988 | Japan |

Primary Examiner—Leszek Kiliman
Attorney, Agent, or Firm—Finnegan, Henderson, Farabow, Garrett & Dunner, L.L.P.

[57] ABSTRACT

A magnetic recording medium is disclosed, which has a magnetic layer containing a hexagonal ferrite powder dispersed in a resin binder, the magnetic layer being formed on a nonmagnetic supporting substrate, wherein the hexagonal ferrite powder is a compound represented by the following chemical formula $$AO \cdot 2 (M^1O) \cdot Fe_{16-x} M^2_x O_{24}$$

where A is at least one element selected from the group consisting of Ba, Sr, Ca, and Pb; $M^1$ is at least one element selected from the group consisting of Zn, Ni and Co; $M^2$ is one combination selected from the group consisting of a combination of two elements of Co and Ti, a combination of two elements of Ti and Zn, and a combination of three elements of Co, Ti and Zn; and x designates a number in the range from 0.6 to 3.0, the hexagonal ferrite powder having an average diameter/thickness ratio in the range from 2.0 to 5.0; the magnetic recording medium of the present invention has both resistance to the temporary variation of coercive force caused by a fluctuation of environmental temperatures and resistance to the permanent variation of the coercive force resulting from a long time storage and operation.

27 Claims, 3 Drawing Sheets

MAGNETIC RECORDING MEDIUM

This application is a continuation of application Ser. No. 08/057,889, filed May 7, 1993, now abandoned, which was a continuation-in-part of application Ser. No. 07/904,065, filed Jun. 26, 1992, now abandoned.

BACKGROUND OF THE INVENTION

1. Field of the Invention

The present invention relates to a magnetic recording medium having stable magnetic characteristics under a variety of operating conditions and suitable for high density recording.

2. Description of the Related Art

In recent years, magnetic recording media have been widely used as media for recording a great amount of information in various applications such as audio systems, video systems, and computer systems. As the magnetic recording media have been widely used, the request for the improvement of their recording density is raised from the users.

As one of the methods for improving the recording density of the magnetic recording medium, a magnetic powder of ultra fine particles where an easily magnetizable axis is perpendicular to a particle plate plane has been developed. For an example of a magnetic powder having an easily magnetizable axis perpendicular to the plate plane, a hexagonal ferrite powder, such as Ba ferrite is exemplified.

Since the easily magnetizable axis of the hexagonal ferrite powder is perpendicular to the particle plate plane, this powder can be easily oriented in a vertical direction in comparison with a conventional needle shaped magnetic powder. Moreover, the hexagonal ferrite powder of ultra fine particles allows the packing density of the magnetic powder into the magnetic layer to be improved. Thus, the hexagonal ferrite powder is suitable for high density recording.

On the other hand, as the storage capacity has been increasing, the application fields of magnetic recording media for example floppy disks have been further widened and the importance and the value of information being recorded have been highly raised. So far, the magnetic media were mostly used under limited environmental conditions of normal temperature and normal humidity. However, as personal word processors and personal computers have gained popularity, now the magnetic recording media have come to be used in a various of environmental conditions. Thus, the magnetic recording media come to require more intense durability and the reliability of data storage. In addition, it is required that the magnetic recording media have the stability of magnetic characteristics. In particular, the stability of coercive force (Hc) which is one of major magnetic characteristics of the magnetic recording media is strictly required.

To improve the stability of coercive force (Hc) of the magnetic recording media, two types of variations of coercive force (Hc) should be considered. One is a temporary variation of coercive force (Hc) caused by a fluctuation of environmental temperatures. The other is a permanent variation of coercive force (Hc) resulting from a long time storage under abnormal environmental conditions, such as high humidity and/or high temperature.

Hereinafter, in this specification, the variation of coercive force (Hc) caused by a variation of ambient temperature is referred to as the temperature variation of coercive force ($\delta$Hc), while the permanent variation of coercive force (Hc) under abnormal environmental conditions are referred to as the environmental variation of coercive force ($\Delta$Hc).

The temperature variation of coercive force ($\delta$Hc) depends on an environmental temperature condition. As a means for decreasing the temperature variation of coercive force ($\delta$Hc) of a magnetic powder, techniques disclosed by, for example, Japanese Patent Laid-Open Documents Serial Nos. SHO 63-139017, SHO 63-144118, and SHO 56-60001 have been known. In the documents of SHO 63-139017 and SHO 63-144118, techniques for coating a spinel type ferrite onto a surface of plate shaped hexagonal ferrite are disclosed. On the other hand, in the document of SHO 56-60001, also disclosed is a dual-structured hexagonal ferrite magnetic powder containing a magnetoplumbite type crystalline structure phase and a spinel type crystalline structure phase. By using these related arts, the temperature variation of coercive force ($\delta$H) of magnetic powders could be reduced.

However, the permanent variation of coercive force or the environmental variation of coercive force ($\Delta$Hc), which is caused by a long time storage of magnetic recording media under abnormal environmental conditions other than normal temperature and normal humidity was not yet known and disclosed. The environmental variation of coercive force ($\Delta$Hc) completely differs from the temporary variation of coercive force ($\delta$Hc) in their characteristics. Since the environmental variation of coercive force ($\Delta$Hc) is permanent, the coercive force (Hc) having been varied is never restored to the original coercive force. Thus, when magnetic recording media are operated for a long time, the environmental variation of coercive force ($\Delta$Hc) has become a remarkable drawback for recording and reproducing.

SUMMARY OF THE INVENTION

The present invention has been made to keep the coercive force ($\Delta$Hc) of a magnetic recording medium stable. More specifically, the object of the present invention is to provide a magnetic recording medium being resistant to both the temperature variation of coercive force ($\delta$Hc) and the environmental variation of coercive force ($\Delta$Hc) and suitable for high density recording.

The present invention is a magnetic recording medium having a magnetic layer containing a hexagonal ferrite powder dispersed in a resin binder, the magnetic layer being formed on a nonmagnetic supporting substrate, wherein the hexagonal ferrite powder is a compound represented by the following chemical formula

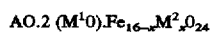

$$AO.2\ (M^1O).Fe_{16-x}M^2{}_xO_{24}$$

where A is at least one element selected from the group consisting of Ba, Sr, Ca and Pb; $M^1$ is at least one element selected from the group consisting of Zn, Ni and Co; $M^2$ is one combination selected from the group consisting of a combination of two elements of Co and Ti, a combination of two elements of Ti and Zn, and a combination of three elements of Co, Ti and Zn; and x designates a number in the range from 0.6 to 3.0, the hexagonal ferrite powder having an average diameter/thickness ratio in the range from 2.0 to 5.0.

Before presenting detail description of the magnetic recording medium of the present invention, the variation of coercive force (Hc) in a magnetic powder or a magnetic recording medium will be mentioned. As was described above, it is considered that the variation of coercive force (Hc) can be categorized as the temperature variation of coercive force ($\delta$Hc) and the environmental variation of coercive force ($\Delta$Hc).

The temperature variation of coercive force (δHc) of a magnetic powder or a magnetic recording medium represents a degree of temperature dependence of coercive force (Hc) which temporarily varies depending on a temperature condition. FIG. 2 is a chart showing a temperature dependency of coercive force of two types of magnetic powders (a) and (b). The figure illustrates how coercive force (Hc) of two types of magnetic powders (a) and (b) having a different composition varies depending on the temperature. In FIG. 2, curve (a) represents coercive force (Hc) of a magnetic powder (a), while curve (b) represents coercive force (b) of the magnetic powder (b). As shown in FIG. 2, the degree of temperature variation of coercive force (δHc) of magnetic powders depends on their compositions.

FIG. 3 is a chart showing a temperature dependency of coercive force (Hc) of two types of magnetic recording media containing respectively the two types of magnetic powders (a) and (b) shown in FIG. 2.

As shown in FIGS. 2 and 3, it is understood that the temperature variation of coercive force (δHc) of magnetic powders tends to be almost in accordance with that of the magnetic recording media. Thus, it is clear that using a magnetic powder where the temperature variation of coercive force (δHc) is stable, the temperature variation of coercive force (δHc) of a magnetic recording medium can be decreased.

On the other hand, the environmental variation of coercive force (ΔHc) of a magnetic powder or a magnetic recording medium represents a degree of the permanent variation of coercive force (Hc) caused under environmental conditions where the magnetic powder or the magnetic recording medium is stored or used.

FIG. 4 is a chart showing the environmental variation of coercive force (ΔHc) of the magnetic powder (a). FIG. 5 is a chart showing the environmental variation of coercive force (ΔHc) of a magnetic recording medium produced with the magnetic powder (a). As shown in FIGS. 4 and 5, it is apparent that there is no particular correlation between the environmental variation of coercive force (ΔHc) of a magnetic powder and the temperature variation of coercive force (δHc) of a magnetic recording medium produced therewith.

Thus, to obtain a magnetic recording medium where the environmental variation of coercive force (ΔHc) is stable, it is considered that factors which are present in magnetic recording media would have to be studied rather than the compositions thereof. Accordingly, studies were made on a variety of factors which are present in magnetic recording media. As a result, it has been found that among these factors two factors mainly cause the increase of the environmental variation of coercive force (ΔHc) of magnetic recording media. One of the two factors is found to be the elution of metallic ions and impurities from a magnetic powder into the magnetic layer. The other is found to be the shape of the magnetic powder particles.

Usually, hardening agents such as isocyanate compounds or the like are added to the magnetic coating materials which are used for forming the magnetic layer. When large quantities of metallic ions have eluted from the magnetic powder into the magnetic layer, a reacting radical of a hardening agent does not satisfactorily react with a resin binder, but with the metallic ions which have eluted from the magnetic powder. Thus, the resin binder cannot be three-dimensionally coupled and the magnetic powder is present in the magnetic layer in a very unstable state. In other words, since the magnetic powder vibrates in the magnetic layer, corresponding to the environmental conditions fluctuation, the environmental variation of coercive force (ΔHc) takes place.

In addition, as a result of the studies on the shapes of magnetic particles, it has been found that the average diameter/ thickness ratio of magnetic particles affects the environmental variation of coercive force (ΔHc) of magnetic recording media. The diameter/thickness ratio of the hexagonal ferrite powder is represented with the ratio of the diameter D of the plate surface of hexagonal plate shaped magnetic particles and the thickness of the plate (D / t).

The present invention was made from the above mentioned point of view. The magnetic recording medium of the present invention contains a magnetic powder having resistances to temperature variations of coercive force (δHc) and to the elution of metallic ions into the magnetic layer and also having a predetermined average diameter/thickness ratio. With this constitution, a magnetic recording medium having resistances to both the temperature variation of coercive force (ΔHc) and the environmental variation of coercive force (δHc) and suitable for high density recording can be obtained.

Then, the following is the details of the magnetic recording medium according to the present invention.

The magnetic powder composition of the present invention is a W composition magnetic powder containing both a magnetoplumbite phase and a spinel phase which are coexisting at a particular ratio. The variation of coercive force (Hc) which takes place in the magnetoplumbite phase corresponding to the temperature fluctuation is offset by the variation of coercive force (Hc) which takes place in the spinel phase. Thus, with respect to the magnetic powder as mentioned above, the temperature variation of coercive force (δHc) is stable.

Since the magnetic recording medium of the present invention contains the aforementioned magnetic powder, the temperature variation of coercive force (δHc) of the magnetic recording medium becomes stable.

In addition, the magnetic powder according to the present invention contains metallic elements such as Co, Ti, and Zn for substitution elements, the elution of such ions into the magnetic layer is hard to occur. With the substitution of above mentioned element in a predetermined amount, the coercive force (Hc) or the particle diameters can be controlled and the saturation magnetization can be improved.

When it is assumed that the quantity x of the above mentioned substitution elements is smaller than 0.6, the coercive force (Hc) abnormally increases and thereby a magnetic powder suitable for magnetic recording media cannot be obtained. On the other hand, when it is assumed that the quantity x of the substitution elements exceeds 3.0, the substitution elements are likely to elute into the magnetic layer and the proper coercive force (Hc) cannot be obtained.

Thus, it is preferable that the quantity x of the above mentioned substitution elements is in the range from 0.6 to 3.0 and more preferably in the range from 0.8 to 2.2. In these ranges, the coercive force can be easily controlled in the range from 600 to 2000 Oe, which is suitable for high density recording. In particular, when the coercive force is controlled in the range from 850 to 2000 Oe, a much higher density recording can be accomplished.

The average particle diameter of the hexagonal ferrite powder according to the present invention is preferably in the range from 0.02 to 0.8 μm. When the average particle diameter is larger than 0.8 μm, the S/N ratio would be decreased and the high density recording could not be accomplished. On the other hand, when the average particle diameter of the hexagonal ferrite powder is smaller than 0.02 μm, the particles cannot be satisfactorily dispersed in the magnetic layer and high density recording could not be accomplished.

The average diameter/thickness ratio of the magnetic powder according to the present invention is preferably in the range from 2.0 to 5.0, more preferably in the range from 2.8 to 4.4. Thus, magnetic particles are individually and stably held in the magnetic layer in a three-dimensional coupled state. Therefore, the environmental variation of coercive force (ΔHc) of the magnetic recording medium becomes stable.

In consideration of the overriding characteristics of the magnetic recording medium according to the present invention, the thickness of the magnetic layer is preferably in the range from 0.3 to 0.7 μm. With such a thin magnetic layer, a better effect can be obtained.

To accomplish much higher density recording with the magnetic recording medium according to the present invention, the squareness ratio (after compensation of demagnetizing field) in the vertical direction of the film surface of the magnetic layer is preferably 0.7 or more. When the squareness ratio in the vertical direction is 0.7 or more, the magnetic field in the vertical direction of the film surface can be more effectively used. Thus, in a short wavelength recording range, a high reproducing output can be obtained. Therefore, when it is assumed that the squareness ratio in the vertical direction of the film surface of the magnetic layer is 0.7 or more, the magnetic recording media of this type is suitable for magnetic recording media such as floppy disks which are required to have a high recording density.

In addition, the squareness ratio (after compensation of demagnetizing field) in the longitudinal direction of the film of the magnetic recording medium according to the present invention could be 0.7 or more. When it is assumed that the squareness ratio in the longitudinal direction of the film is 0.7 or more, a reproducing output in a long wavelength range of 4.0 to 5.0 μm could be increased. Thus, when it is assumed that the squareness ratio in the longitudinal direction of the film of the magnetic layer is 0.7 or more, the magnetic recording media of this type is suitable for magnetic tapes for use in recording color signals in a long wavelength range.

According to the present invention, a variety of resin binders hitherto known are employable for the resin binder. For example, a polyurethane-type resin, a polyester-type resin, a polycarbonate-type resin, a polyacryl-type resin, an epoxy-type resin, a phenol-type resin, a vinyl chloride-type resin, a vinyl acetate-type resin, mixtures thereof, copolymers thereof, or the like are available as a resin binder.

When it is assumed that the squareness ratio in the vertical direction or the longitudinal direction of the film of the magnetic layer is 0.7 or more, it is preferable to select a soft resin and a hard resin from the above mentioned resins and to use them together. Examples of soft resin are polyurethane-type resins such as N-2301 (trade name; Nippon Polyurethane Co., Ltd.) and urethane denatured resins. Examples of hard resin are a copolymer of vinyl chloride and vinyl acetate (such as VAGH trade name, US Union Carbide Corp.) and cellulose type-resins (such as nitrocellulose). By using the soft resin and the hard resin together, it is noted that they can perform two well balanced roles, one role being the contribution to the orientation property and the other role holding the oriented particles. In addition, the durability of the magnetic recording medium can be improved.

As the lubricant for use in the magnetic recording medium according to the present invention, a variety of lubricants hitherto known and widely used are employable. Examples of these lubricants are lauric acid, palmitic acid, and stearic acid. In addition, if necessary, dispersants such as lecithin and other surface active agents can be used.

As the abrasive for use in the magnetic recording medium according to the present invention, inorganic powders such as $TiO_2$, $Cr_2O_3$, $Al_2O_3$, SiC, and $ZrO_2$, whose Morse hardness is 5 or more, are employable. The inorganic powder to be selected should have an average particle diameter in the range from 0.1 to 2.0 μm. It is preferable to mix the selected inorganic powder of 0.5 to 10 parts by weight with the magnetic powder of 100 parts by weight.

The method for obtaining the hexagonal ferrite powder according to the present invention, conventional methods such as the glass crystallizing method, the coprecipitation method, or the hydrothermal synthesizing method can be used. Among these methods, it is preferable to use the glass crystallizing method. This is because this method easily provides a hexagonal ferrite powder with an average particle diameter in the range from 0.02 to 0.8 μm suitable for high density magnetic recording.

DESCRIPTION OF PREFERRED EMBODIMENTS

Figure 1:
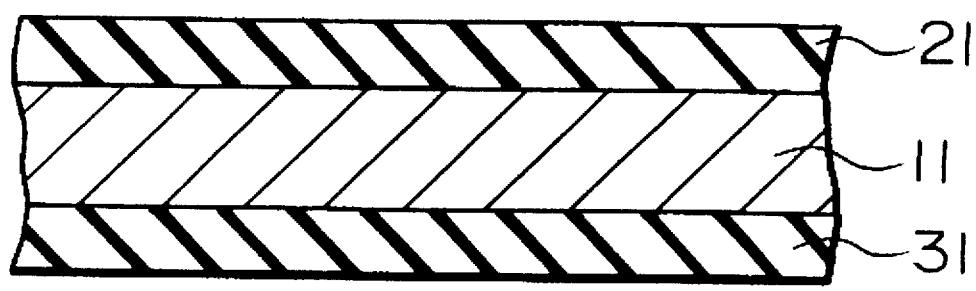
FIG. 1 is a sectional view showing a construction of an embodiment of a magnetic recording medium of the present invention.
Figure 2:
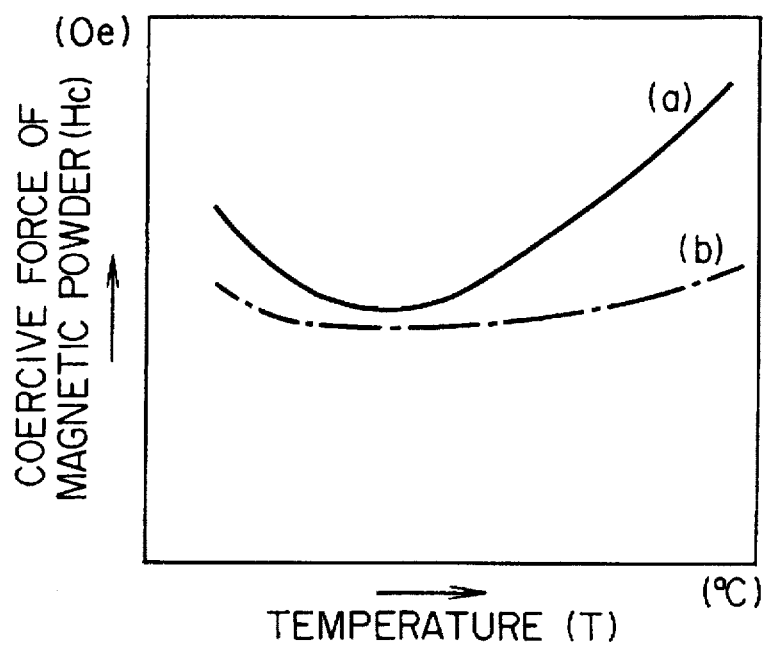
FIG. 2 is a chart showing a temperature dependency of coercive force (Hc) of magnetic powders, representing the relation between the coercive force (Hc) of the magnetic powders and the temperature (T)
Figure 3:
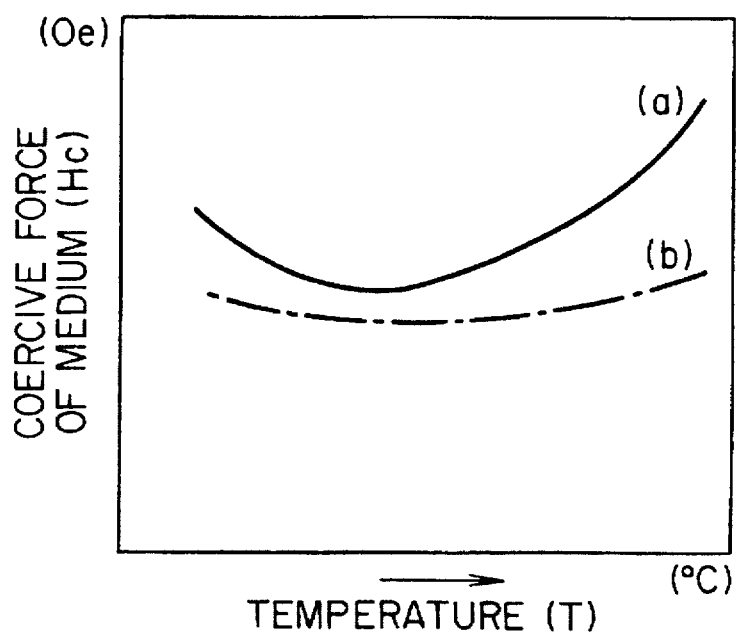
FIG. 3 is a chart showing a temperature dependency of coercive force (Hc) of magnetic recording media, representing the relation between the coercive force (Hc) of the magnetic recording media and the temperature (T)
Figure 4:
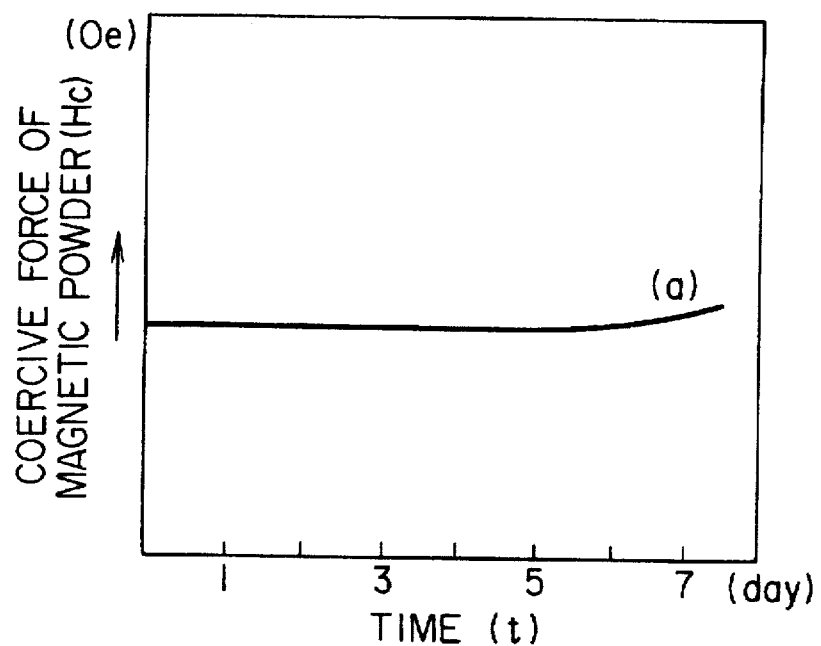
FIG. 4 is a chart showing a situation where coercive force (Hc) of a magnetic powder varies time by time.
Figure 5:
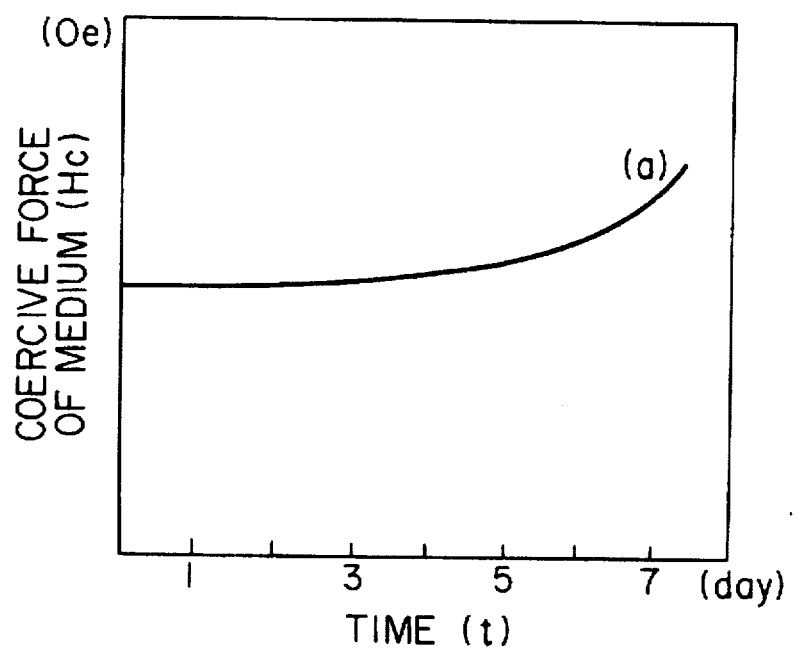
FIG. 5 is a chart showing a situation where coercive force (Hc) of a magnetic recording medium varies time by time.

Table 1 lists compositions and characteristics of hexagonal ferrite powders for use in obtaining the magnetic recording media according to the present invention.

TABLE 1

| Specimen No | Hexagonal ferrite composition | | | | | | | Average Diameter/ thickness ratio D/t | Average Particle diameter (μmm) | Coercive force HC (Oe) | Temperature Variation of coercive force Hc (Oe/C) |
|---|---|---|---|---|---|---|---|---|---|---|---|
| | A | $M^1$ | | | $M^2$ | | | | | | |
| | | Zn | Ni | Co | Co | Ti | Zn | | | | |
| 1 | Ba | 0.5 | 0.5 | — | 0.93 | 0.93 | — | 3.9 | 0.052 | 620 | −0.2 |
| 2 | Ba | 0.5 | 0.5 | — | 0.90 | 0.90 | — | 3.1 | 0.050 | 730 | 0 |

TABLE 1-continued

| Specimen No | Hexagonal ferrite composition | | | | | | Average Diameter/ thickness ratio D/t | Average Particle diameter (μmm) | Coercive force HC (Oe) | Temperature Variation of coercive force Hc (Oe/C) |
|---|---|---|---|---|---|---|---|---|---|---|
| | A | $M^1$ | | | $M^2$ | | | | | |
| | | Zn | Ni | Co | Co | Ti | Zn | | | | |
| 3 | Ba | 0.5 | 0.5 | — | 0.32 | 0.32 | — | 3.9 | 0.053 | 1810 | −0.2 |
| 4 | Ba | 0.5 | 0.5 | — | — | 1.00 | 1.00 | 3.3 | 0.049 | 730 | −0.6 |
| 5 | Ba | 0.5 | 0.5 | — | 0.42 | 0.84 | 0.42 | 4.1 | 0.050 | 750 | −0.5 |
| 6 | Ba | 0.5 | 0.5 | — | 0.96 | 0.96 | — | 2.8 | 0.048 | 710 | +0.1 |
| 7 | Ba | 0.5 | 0.5 | — | 0.30 | 0.30 | — | 4.7 | 0.051 | 1900 | −0.8 |
| 8 | Ba | 0.5 | 0.5 | — | 0.10 | 0.10 | — | 3.2 | 0.055 | 2500 | +1.2 |
| 9 | Ba | 0.5 | 0.5 | — | 0.50 | 1.00 | 0.50 | 1.8 | 0.050 | 770 | +1.0 |
| 10 | Ba | 0.75 | 0.25 | — | 0.90 | 0.90 | — | 3.3 | 0.051 | 710 | +0.5 |
| 11 | Ba | 0.25 | 0.75 | — | 0.90 | 0.90 | — | 2.9 | 0.055 | 950 | −0.1 |
| 12 | Ba | — | 1.0 | — | 0.90 | 0.90 | — | 2.7 | 0.057 | 1100 | −0.2 |
| 13 | Ba | 0.5 | — | 0.5 | 0.90 | 0.90 | — | 3.3 | 0.057 | 500 | +1.5 |
| 14 | Ba | — | 0.5 | 0.5 | 0.90 | 0.90 | — | 3.4 | 0.055 | 780 | −1.5 |
| 15 | Ba | 0.5 | 0.5 | — | 0.65 | 0.65 | — | 4.1 | 0.060 | 750 | +1.0 |

The magnetic powders specimens 1 to 14 listed in Table 1 can be produced by the glass crystallizing method in the following manner. For example, to constitute the hexagonal ferrite powder of the magnetic powder specimen 5, starting raw materials such as BaO, $Fe_2O_3$, CoO, ZnO, NiO, and $TiO_2$ for predetermined amounts were mixed together with a $B_2O_3 \cdot BaO$ glass. Then, the resultant mixture was heated and melted at 1350° C. Thereafter, the melted mixture was dropped onto rotating twin rolls. Next, the mixture was quenched and rolled to obtain an amorphous substance. Subsequently, the amorphous substance was heated to an elevated temperature of 800° C. for four hours. A hexagonal ferrite crystal with substituted elements of predetermined amounts was crystallized in an amorphous matrix. The obtained crystal was rinsed with diluted acetic acid and demineralized water in this sequence. Thereafter, the crystal was dried and the desired hexagonal Ba ferrite powder was obtained.

The magnetic powder of specimen 15 can be produced by the hydrothermal synthesis method. To prepare the hexagonal ferrite powder of specimen 15, starting raw material in an aqueous solution of metal chlorides ($BaCl_2$, $FeCl_3$, $ZnCl_2$, $NiCl_2$, $CoCl_2$ and TiCl) were mixed together with an aqueous solution which contained excess amount of NaOH. The resultant mixture was heated at 100° C. for 1 hour, and rinsed to remove the resultant NaCl to obtain the precursor of the hexagonal ferrite powder. Subsequently, the precursor was baked at 800° C. to obtain hexagonal ferrite magnetic powder. NaCl does not necessarily need to be rinsed from the precursor since any NaCl present in the precursor acts as a flux.

The followings are the description of the magnetic recording media produced with the magnetic powders listed in Table 1 and obtained in the above-described manner as embodiments of the present invention.

Embodiment 1

Before producing a magnetic recording medium of the present invention, the following materials were mixed together in equal amounts. Then, with a sand grinder, these materials were sufficiently dispersed and thereby a magnetic coating material was produced.

[Composition of magnetic coating material]

| | |
|---|---|
| Magnetic powder specimen 1 | 100 parts by weight |
| A1203 powder (average particle diameter = 0.3 μm) | 4 parts by weight |
| Phosphoric ester | 1 part by weight |
| Polyurethane resin (average molecular weight = 45000) | 10 parts by weight |
| Copolymer resin of vinyl chloride and vinyl acetate (average molecular weight = 32000) | 5 parts by weight |
| Fatty acid ester | 4 parts by weight |
| Methyl ethyl ketone | 60 parts by weight |
| Cyclohexane | 60 parts by weight |
| Toluene | 60 parts by weight |

The resultant coating material was filtered with a filter so as to remove impurities and excessively large particles from it. The filtered magnetic coating material was mixed with an isocyanate compound of 3 parts by weight as a hardener and then stirred together.

Thereafter, as shown in FIG. 1, a polyester film (11) having a thickness of 80 μm was prepared as a nonmagnetic supporting substrate. Then, the above mentioned magnetic coating material was equally coated on this film (11) by using a reverse coater and thereby a magnetic layer (21) was provided. The amount of coating material being coated was adjusted so that the thickness of the magnetic layer after the drying and calendering processes became 0.3 μm. After the coated film was dried and calendered, its surface was smoothened. Thereafter, the coated film was properly hardened in a high temperature cure tank at 60° C.

In addition, on the reverse surface of the polyester film (11) where the magnetic layer (21) was provided, the magnetic coating material was coated in the same manner as described above. Thereafter, the film was dried and calendered. Next, the film was hardened in the same manner as described above and thereby a magnetic layer (31) was provided.

Thereafter, the film where the magnetic layers (21) and (31) were formed on both the sides thereof was punched to produce a circular disk having a diameter of 3.5 inches. Then, a metallic center core was attached to the center of the disk. The resultant disk was rotatably accommodated in a jacket. Thus, a 3.5 inch floppy disk was obtained. In the above manner, the magnetic recording medium of embodiment 1 of the present invention was obtained.

Embodiments 2 to 7

Magnetic recording media of embodiments 2 to 7 of the present invention were obtained in the same manner as the embodiment 1, except that the magnetic powder specimens 2 to 7 listed in Table 1 were used, respectively. The magnetic powder specimen numbers accord with embodiment numbers of the magnetic recording media produced therewith.

Embodiment 8

A magnetic recording medium was produced in the same manner as embodiment 1, except that the magnetic powder specimen No. 2 was used as a magnetic powder and after the magnetic coating material was coated, the film was passed through a vertically oriented magnetic field of 6 kOe where the S pole and N pole were opposite each other for orienting the magnetic particles.

Embodiment 9

A magnetic recording medium was produced in the same manner as embodiment 8, except that polyurethane resin (average molecular weight=24000) of 9 parts by weight and copolymer resin of vinyl chloride and vinyl acetate (average molecular weight=32000) of 4 parts by weight were used as resin binders.

Embodiment 10

A magnetic recording medium was produced in the same manner as embodiment 9, except that the magnetic powder specimen No. 3 was used as a magnetic powder.

Embodiments 11 to 16

Magnetic recording media of embodiments 11 to 16 of the present invention were obtained in the same manner as embodiment 1, except that the magnetic powder specimens of 10 to 15 listed in Table 1, respectively, were used. The magnetic recording media embodiments 11, 12, 13, 14, 15, and 16 correspond, respectively, with the magnetic powder specimens 10, 11, 12, 13, 14, and 15.

Thereafter, various characteristics of the magnetic recording media of the embodiments 1 to 16 produced in the above manners were evaluated. The evaluation results are shown in Table 2. Measurement of each evaluation item listed in Table 2 was done in the following manner.

An output and an S/N ratio of each magnetic recording medium were evaluated by using an MIG (Metal-In-Gap) head with a gap length of 0.4 μm and a track width of 35 μm by measuring an optimum output current at a recording density of 35 kFRPI(Flux Reversal Per Inch). In these evaluations, the rotations of the disks were at 300 rpm and the tracks evaluated were the innermost track, 79th track.

The environmental variation of coercive force (ΔHc) of each magnetic recording medium was obtained by using the following formula $$\{(Hc''-Hc')/Hc'\}\times 100$$

where Hc' is the initial coercive force and Hc'' is the coercive force at which the magnetic recording medium was kept under high temperature (60° C.) and high humidity (90%) condition for one week. In the Table 2, the case of Hc'<Hc'' is represented with "+", while the case of Hc'>Hc'' is represented with "−".

The durability of each magnetic recording medium was evaluated in three environmental conditions: (1) low temperature and low humidity condition, (2) high temperature and high humidity condition, and (3) cyclic condition where the conditions (1) and (2) were cycled. In the (1) low temperature and low humidity condition, the temperature was at 5° C. and the humidity was at 10%. In the (2) high temperature and high humidity condition, the temperature was at 60° C. and the humidity was at 90%. In the (3) cyclic condition, the condition (1) and the condition (2) were periodically shifted to each other at a frequency every 24 hours. In these three conditions, each disk was run and each evaluation was conducted at 12th track defined in JIS (Japanese Industrial Standard). When the output of each disk was reduced to a level of 70% relative to an initial output or when some damage was visually observed on the surface thereof, it was determined that the durability of the disk expired. In the Table 2, each result is represented with the number of running passes (in the unit of 10,000 passes) in a predetermined reference period of time.

TABLE 2

| | Squareness Ratio SQR | Output (dB) | S/N (dB) | Envi. variation of coercive force (Δ Hc) (%) | Durability (× 10,000 passes) | | |
|---|---|---|---|---|---|---|---|
| | | | | | Cond. 1 | Cond. 2 | Cond. 3 |
| Embod. 1 | 0.55 | 0 | 0 | +0.3 | 1500 or more | 1200 | 1300 |
| Embod. 2 | 0.53 | +0.4 | +1.5 | +0.5 | 1500 or more | 1250 | 1400 |
| Embod. 3 | 0.56 | +4.8 | +4.0 | +0.3 | 1500 or more | 1100 | 1350 |
| Embod. 4 | 0.55 | +1.0 | +2.0 | +0.4 | 1500 or more | 1400 | 1500 or more |
| Embod. 5 | 0.57 | +1.1 | +1.5 | +0.2 | 1500 or more | 1300 | 1500 or more |
| Embod. 6 | 0.54 | +0.4 | +1.0 | +0.6 | 1500 or more | 1500 | 1500 or more |
| Embod. 7 | 0.57 | +5.2 | +5.8 | −0.2 | 1500 or more | 950 | 860 |
| Embod. 8 | 0.75 | +3.6 | +3.8 | +0.5 | 1500 or more | 1210 | 1300 |
| Embod. 9 | 0.82 | +4.5 | +4.6 | +0.2 | 1200 or more | 920 | 1030 |
| Embod. 10 | 0.83 | +8.6 | +8.0 | +0.1 | 1050 or more | 870 | 980 |
| Embod. 11 | 0.55 | +0.6 | +0.9 | +0.2 | 1500 or more | 1120 | 1460 |
| Embod. 12 | 0.53 | +1.5 | +2.0 | +0.6 | 1500 or more | 1230 | 1500 or more |
| Embod. 13 | 0.55 | +2.6 | +2.3 | +0.7 | 1500 or more | 1300 | 1320 |
| Embod. 14 | 0.56 | 0 | +0.2 | +0.1 | 1500 or more | 1210 | 1450 |
| Embod. 15 | 0.55 | +1.0 | +1.3 | +0.1 | 1500 or more | 1400 | 1500 or more |
| Embod. 16 | 0.57 | +1.5 | +1.3 | +0.3 | 1500 or more | 1150 | 1300 |
| Comp. 1 | 0.54 | +3.5 | +2.1 | +0.8 | 700 | 300 | 600 |
| Comp. 2 | 0.55 | +0.9 | +1.0 | +3.8 | 1500 or more | 900 | 1000 |

Note:
Embod. is an abbreviation of Embodiment.
Comp. is an abbreviation of Comparison example.
Cond. 1 is low temperature and low humidity condition.

TABLE 2-continued

| Squareness Ratio | Output | S/N | Envi. variation of coercive force | Durability (× 10,000 passes) | | |
|---|---|---|---|---|---|---|
| SQR | (dB) | (dB) | (Δ Hc) (%) | Cond. 1 | Cond. 2 | Cond. 3 |

Cond. 2 is high temperature and high humidity condition.
Cond. 3 is cyclic condition of Cond. 1 and Cond. 2.

Then, magnetic recording media as comparison examples 1 and 2 were produced in the same manner as the embodiment 1 except that they contained magnetic powders with ferrite compositions and diameter/thickness ratios which were not in accordance with the present invention. The characteristics of these comparison examples were compared with those of the embodiments. Magnetic powders with ferrite compositions and diameter/thickness ratios which were not in accordance with the present invention are listed in Table 1 as the magnetic powder specimens 8 and 9.

COMPARISON EXAMPLES 1 AND 2

Magnetic recording media as the comparison examples 1 and 2 were produced in the same manner as the embodiment 1 except that the magnetic powder specimens 8 and 9 were used as magnetic powders. Thus, the magnetic powder specimen numbers accord with the comparison examples of magnetic recording media.

Subsequently, various characteristics of the magnetic recording media of the comparison examples 1 and 2 being produced were evaluated in the same manner as the above mentioned embodiments. The evaluation results of these comparison examples are listed in Table 2 along with those of the embodiments.

As listed in Table 2, it is found that the output and S/N ratio of each floppy disk being produced as the embodiments of the present invention are superior to those of the comparison examples. In addition, it is apparent that the environmental variation of coercive force (ΔHc) of each embodiment is much smaller than that of each comparison example. The environmental variation of coercive force of each embodiment is in the range from −1.0% to +1.0%. Moreover, it is clear that the durability in the high temperature and high humidity condition, in the low temperature and low humidity condition, and also in the cyclic condition of each embodiment is higher than that of each comparison example.

In addition, as listed in Table 1, it is found that the absolute value of the temperature variation of coercive force (δHc) of each magnetic powder used in the embodiments is as small as 1.5 (Oe / °C.) or less. The temperature variation of coercive force (δHc) of magnetic recording media tends to almost equal to that of the magnetic powders thereof. Thus, according to the present invention, the temperature variation of coercive force (δHc) of magnetic recording media also can be stabilized.

In the above mentioned embodiments, the particular magnetic layer was disposed on both the surfaces of the particular nonmagnetic supporting substance. However, the present invention is not limited to this construction. And, it should be anticipated that another magnetic layer may be disposed along with the particular magnetic layer or that a conductive layer or a bonding layer may be disposed between the particular nonmagnetic supporting substrate and the particular magnetic layer.

In the above mentioned embodiments, floppy disks were exemplified, however, it should be noted that the present invention is not limited to those, but applicable to other magnetic recording media such as magnetic tapes.

As described above, according to the present invention, a hexagonal ferrite powder is selected as a magnetic powder in such a state that it has resistances to temperature variation of coercive force and to elution of metallic ions into the magnetic layer. In addition, the average diameter/thickness ratio of the hexagonal ferrite powder is limited to the predetermined range. Thus, the magnetic recording medium with stable magnetic characteristics where both the temperature variation of coercive force (δHc) and the environmental variation of coercive force (ΔHc) are small can be obtained. Moreover, since the magnetic recording medium according to the present invention provides high output and high S/N ratio, it is especially suitable for high density recordings.

What is claimed is:

1. A magnetic recording medium comprising:
   a nonmagnetic supporting substrate; and
   a magnetic layer formed on said nonmagnetic supporting substrate, said magnetic layer having hexagonal ferrite powder and a rein binder in which said hexagonal ferrite powder is dispersed;
   wherein said hexagonal ferrite powder has an average diameter/thickness ratio in the range from 2:1 to 5:1 and said hexagonal ferrite powder is represented by the following chemical formula:

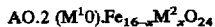
   $$AO.2\ (M^1O).Fe_{16-x}M^2_xO_{24}$$

where A is at least one element selected from the group consisting of Ba, Sr, Ca, and Pb; $M^1$ is at least one element selected from the group consisting of Zn, Ni, and Co; $M^2$ is one combination selected from the group consisting of a combination of two elements of Co and Ti, a combination of two elements of Ti and Zn, and a combination of three elements of Co, Ti, and Zn; and x designates a number in the range from 0.6 to 3.0.

2. The magnetic recording medium according to claim 1, wherein said hexagonal ferrite powder has a temperature coefficient of coercive force in the range from −1.5 to +1.5 Oe/°C.; and
   an environmental variation of coercive force of said magnetic recording medium in the range from −1.0% to +1.0%, said environmental variation of coercive force given by the following formula $$\{(Hc''-Hc') / HC'\} \times 100$$

where Hc' is the initial coercive force and Hc" is the coercive force measured after keeping under the circumstantial condition of a temperature of 60° C. and a relative humidity of 90% for one week.

3. The magnetic recording medium according to claim 1, wherein said hexagonal ferrite powder has an average diameter/thickness ratio in the range from 2.8 to 4.4.

4. The magnetic recording medium according to claim 1, wherein said hexagonal ferrite powder is a Ba ferrite powder.

5. The magnetic recording medium according to claim 1, wherein $M^1$ is a combination of two elements of Zn and Ni.

6. The magnetic recording medium according to claim 1, wherein $M^2$ is a combination of two elements of Co and Ti.

7. The magnetic recording medium according to claim 1, wherein $M^2$ is a combination of two elements of Ti and Zn.

8. The magnetic recording medium according to claim 1, wherein $M^2$ is a combination of three elements of Co, Ti and Zn.

9. The magnetic recording medium according to claim 2, wherein said hexagonal ferrite powder has an average diameter/thickness ratio in the range from 2.8 to 4.4.

10. The magnetic recording medium according to claim 2, wherein said hexagonal ferrite powder is a Ba ferrite powder.

11. The magnetic recording medium according to claim 2, wherein $M^1$ is a combination of two elements of Zn and Ni.

12. The magnetic recording medium according to claim 2, wherein $M^2$ is a combination of two elements of Co and Ti.

13. The magnetic recording medium according to claim 2, wherein $M^2$ is a combination of two elements of Ti and Zn.

14. The magnetic recording medium according to claim 2, wherein $M^2$ is a combination of three elements of Co, Ti and Zn.

15. The magnetic recording medium according to claim 10, wherein $M^1$ is a combination of two elements of Zn and Ni.

16. The magnetic recording medium according to claim 15, wherein said hexagonal ferrite powder has an average diameter/thickness ratio in the range from 2.8 to 4.4.

17. The magnetic recording medium according to claim 16, wherein a squareness ratio in the longitudinal direction of said magnetic layer is 0.7 or more.

18. The magnetic recording medium according to claim 15, wherein a squareness ratio in the vertical direction of said magnetic layer is 0.7 or more.

19. The magnetic recording medium according to claim 1, wherein said hexagonal ferrite powder is prepared by a process comprising the steps of:

mixing a predetermined amount of metal oxides with glass-forming agents to form a mixture of component of a hexagonal ferrite represented by said chemical formula;

heating said mixture of components to a temperature to form a melt of said mixture;

cooling said molten substance rapidly thereby producing an amorphous matrix;

heating said amorphous matrix to a temperature sufficient to form hexagonal ferrite crystals in said amorphous matrix;

rinsing said amorphous matrix with an acid, thereby separating said crystal of said hexagonal ferrite and recovering said hexagonal ferrite powder.

20. The magnetic recording medium according to claim 1, wherein said hexagonal ferrite powder is prepared by a process comprising the steps of:

preparing an alkali metal aqueous solution comprising predetermined amount of ions for a hexagonal ferrite represented by said chemical formula;

adding alkali to said alkali metal aqueous solution, thereby producing an alkaline solution;

heating said alkaline solution to a temperature to precipitate a precursor of said hexagonal ferrite;

heating said precursor to a temperature sufficient to form said hexagonal ferrite magnetic powder; and recovering said formed magnetic powder.

21. The magnetic recording medium according to claim 2, wherein the coercive force of said magnetic layer is in the range from 850 to 2000 Oe.

22. The magnetic recording medium according to claim 2, wherein said hexagonal ferrite powder has an average particle diameter in the range from 0.02 to 0.8 μm.

23. A magnetic recording medium comprising:

a nonmagnetic supporting substrate; and a magnetic layer formed on said nonmagnetic supporting substrate, said magnetic layer having a hexagonal ferrite powder and a resin binder in which said hexagonal ferrite powder is dispersed;

wherein a squareness ratio in the longitudinal direction of said magnetic layer is 0.7 or more, and said hexagonal ferrite powder has an average diameter/thickness ratio in the range of from 2.0 to 5.0 and said hexagonal ferrite powder is represented by the following chemical formula $$AO.2(M^1O).Fe_{16-x}M^2{}_xO_{24}$$

where A is at least one element selected from the group consisting of Ba, Sr, Ca, and Pb; $M^1$ is at least one element selected from the group consisting of Zn and Ni; $M^2$ is one combination selected from the group consisting of a combination of two elements of Co and Ti, a combination of two elements of Ti and Zn, and a combination of three elements of Co, Ti, and Zn; and x designates a number in the range from 0.6 to 3.0.

24. A magnetic recording medium comprising:

a nonmagnetic supporting substrate; and a magnetic layer formed on said nonmagnetic supporting substrate, said magnetic layer having a hexagonal ferrite powder and a resin binder in which said hexagonal ferrite powder is dispersed;

wherein a squareness ratio in the vertical direction of said magnetic layer is 0.7 or more, and said hexagonal ferrite powder has an average diameter/thickness ratio in the range of from 2.0 to 5.0 and said hexagonal ferrite powder is represented by the following chemical formula $$AO.2(M^1O).Fe_{16-x}M^2{}_xO_{24}$$

where A is at least one element selected from the group consisting of Ba, Sr, Ca, and Pb; $M^1$ is at least one element selected from the group consisting of Zn and Ni; $M^2$ is one combination selected from the group consisting of a combination of two elements of Co and Ti, a combination of two elements of Ti and Zn, and a combination of three elements of Co, Ti, and Zn; and x designates a number in the range from 0.6 to 3.0.

25. A magnetic recording medium comprising:

a nonmagnetic supporting substrate; and a magnetic layer formed on said nonmagnetic supporting substrate, said magnetic layer having a hexagonal ferrite powder and a resin binder in which said hexagonal ferrite powder is dispersed;

wherein said hexagonal ferrite powder has an average diameter/thickness ratio in the range of from 2.0 to 5.0 and said hexagonal ferrite powder is represented by the following chemical formula $$AO.2(M^1O).Fe_{16-x}M^2{}_xO_{24}$$

where A is at least one element selected from the group consisting of Ba, Sr, Ca, and Pb; $M^1$ is at least one element selected from the group consisting of Zn and Ni; $M^2$ is one combination selected from the group consisting of a combination of two elements of Co and Ti, a combination of two elements of Ti and Zn, and a combination of three elements of Co, Ti, and Zn; and x designates a number in the range from 0.6 to 3.0, so as to reduce a temperature variation of coercive force of said hexagonal ferrite powder and environmental variation of coercive force of said magnetic layer.

26. The magnetic recording medium according to claim 25, wherein said temperature variation of coercive force of said hexagonal ferrite powder is in the range from −1.5 to +1.5 Oe/°C.

27. The magnetic recording medium according to claim 25, wherein said environmental variation of coercive force of said magnetic layer is in the range from −1.0% to +1.0%, said environmental variation of coercive force being given by the following formula $$\{(Hc''-Hc')/Hc'\}\times 100$$

where Hc' is the initial coercive force and Hc" is the coercive force measured after keeping under the circumstantial condition of a temperature of 60° C. and a relative humidity of 90% for a week.

* * * * *